United States Patent
Jang et al.

(10) Patent No.: US 9,708,746 B2
(45) Date of Patent: Jul. 18, 2017

(54) MOTOR DRIVING APPARATUS AND LAUNDRY TREATMENT MACHINE INCLUDING THE SAME

(71) Applicant: LG ELECTRONICS INC., Seoul (KR)

(72) Inventors: Minho Jang, Changwon-si (KR); Hoonbong Lee, Changwon-si (KR); Hansu Jung, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 312 days.

(21) Appl. No.: 14/535,780

(22) Filed: Nov. 7, 2014

(65) Prior Publication Data

US 2015/0128658 A1    May 14, 2015

(30) Foreign Application Priority Data

Nov. 8, 2013 (KR) .................. 10-2013-0135657

(51) Int. Cl.

| | |
|---|---|
| *D06F 37/30* | (2006.01) |
| *D06F 33/02* | (2006.01) |
| *H02P 6/22* | (2006.01) |
| *H02P 1/16* | (2006.01) |
| *H02P 6/18* | (2016.01) |

(Continued)

(52) U.S. Cl.
CPC ............ *D06F 37/304* (2013.01); *D06F 33/02* (2013.01); *H02P 1/16* (2013.01); *H02P 6/18* (2013.01); *H02P 6/21* (2016.02); *H02P 6/22* (2013.01); *H02P 21/34* (2016.02); *D06F 2202/065* (2013.01); *D06F 2202/10* (2013.01); *D06F 2202/12* (2013.01); *D06F 2204/065* (2013.01); *D06F 2222/00* (2013.01); *Y02B 40/52* (2013.01)

(58) Field of Classification Search
None
See application file for complete search history.

(56) References Cited

U.S. PATENT DOCUMENTS

2009/0056385 A1    3/2009   Maekawa

FOREIGN PATENT DOCUMENTS

| CN | 1375125 | 10/2002 |
|---|---|---|
| CN | 101383583 | 3/2009 |
| CN | 101964624 | 2/2011 |

(Continued)

OTHER PUBLICATIONS

JP 2001238480 translation.*

(Continued)

*Primary Examiner* — Michael Barr
*Assistant Examiner* — Rita Adhlakha
(74) *Attorney, Agent, or Firm* — KED & Associates, LLP

(57) ABSTRACT

A laundry treatment machine includes a drum, a motor to rotate the drum, and a driving unit to drive the motor, wherein the driving unit includes an inverter to convert direct current (DC) voltage into alternating current (AC) voltage and to output the AC voltage to the motor and an inverter controller to control the inverter to supply an alignment current to the motor so as to align the motor during a starting operation of the motor and to supply a torque current for rotating the motor to the motor together with the alignment current after the motor is aligned. Such a laundry treatment apparatus prevents a reverse rotation phenomenon of the drum due to load.

20 Claims, 8 Drawing Sheets

(51) Int. Cl.
*H02P 21/34* (2016.01)
*H02P 6/21* (2016.01)

(56) References Cited

FOREIGN PATENT DOCUMENTS

| CN | 102291079 | 12/2011 |
|---|---|---|
| CN | 102437813 | 5/2012 |
| CN | 102487262 | 6/2012 |
| CN | 102545749 | 7/2012 |
| EP | 1 221 765 A1 | 7/2002 |
| EP | 2 629 414 A1 | 8/2013 |
| JP | 2001-161094 | 6/2001 |
| JP | 2001-238480 A | 8/2001 |
| JP | 2003-135883 | 5/2003 |
| JP | 2007-236048 A | 9/2007 |
| JP | 2007-236102 A | 9/2007 |
| JP | 2009-065764 | 3/2009 |
| KR | 10-2006-0068845 A | 6/2006 |
| KR | 10-0629007 B1 | 9/2006 |
| WO | WO 2011/054032 A1 | 5/2011 |

OTHER PUBLICATIONS

European Search Report dated Jun. 3, 2015 issued in Application No. 14192291.4.
Song Chi, et al: "Sliding-Mode Sensorless Control of Direct-Drive PM Synchronous Motors for Washing Machine Applications"; IEEE Transactions on Industry Applications, IEEE Service Center; Piscataway, NJ; vol. 45, No. 2; Mar. 1, 2009; pp. 582-590 (XP 011253774).
European Search Report dated Jul. 28, 2015 issued in Application No. 14192222.9.
Australian Examination Report dated Apr. 15, 2015 issued in Application No. 2014259483.
Australian Examination Report dated Apr. 15, 2015 issued in Application No. 2014259555.
Chinese Office Action dated May 4, 2016 issued in Application No. 201410645337.8 (English translation attached).
Chinese Office Action dated May 4, 2016 issued in Application No. 201410643600.X (English translation attached).
Chinese Office Action dated May 5, 2016 issued in Application No. 201410643584.4 (English translation attached).
Chinese Office Action dated Sep. 1, 2016 issued in Application No. 201410645240.7 (with English translation).
Korean Office Action dated Oct. 4, 2016 issued in Application No. 10-2013-0135654.
Korean Office Action dated Oct. 4, 2016 issued in Application No. 10-2013-0135656.
Korean Office Action dated Oct. 4, 2016 issued in Application No. 10-2013-0135657.
United States Office Action dated Nov. 1, 2016 issued in U.S. Appl. No. 14/535,702.
United States Office Action dated Nov. 1, 2016 issued in U.S. Appl. No. 14/536,004.
U.S. Office Action dated Dec. 2, 2016 issued in co-pending U.S. Appl. No. 14/535,595.

* cited by examiner

MOTOR DRIVING APPARATUS AND LAUNDRY TREATMENT MACHINE INCLUDING THE SAME

CROSS-REFERENCE TO RELATED APPLICATION

This application claims priority under 35 U.S.C. §119 to Korean Application No. 10-2013-0135657, filed on Nov. 8, 2013 in the Korean Intellectual Property Office, whose entire disclosure of which is incorporated herein by reference.

BACKGROUND

1. Field

The present disclosure relates to a motor driving apparatus and a laundry treatment machine including the same and, more particularly, to a motor driving apparatus that is configured to prevent a reverse rotation phenomenon.

2. Background

Generally, a laundry treatment machine washes laundry using frictional force between a washing tub rotated by a driving force of a motor and the laundry in a state in which the laundry is contained in the washing tub together with a detergent and wash water. It is possible to wash the laundry without damage to the laundry and entanglement of the laundry.

The laundry treatment machine generally includes a position sensor to sense a rotor position of the motor. However, a laundry treatment machine which does not use a position sensor is under development so as to reduce manufacturing cost of the laundry treatment machine. In this case, a method of accurately estimating the rotor position of the motor without the position sensor is difficult to achieve.

BRIEF DESCRIPTION OF THE DRAWINGS

The embodiments will be described in detail with reference to the following drawings in which like reference numerals refer to like elements wherein.

DETAILED DESCRIPTION

A laundry treatment machine described in this specification is a laundry treatment machine that is capable of estimating the position of a rotor of a motor to rotate a washing tub without the provision of a position sensor for sensing the position of the rotor of the motor, i.e. in a sensorless mode. Hereinafter, a sensorless laundry treatment machine will be described.

Figure 1:
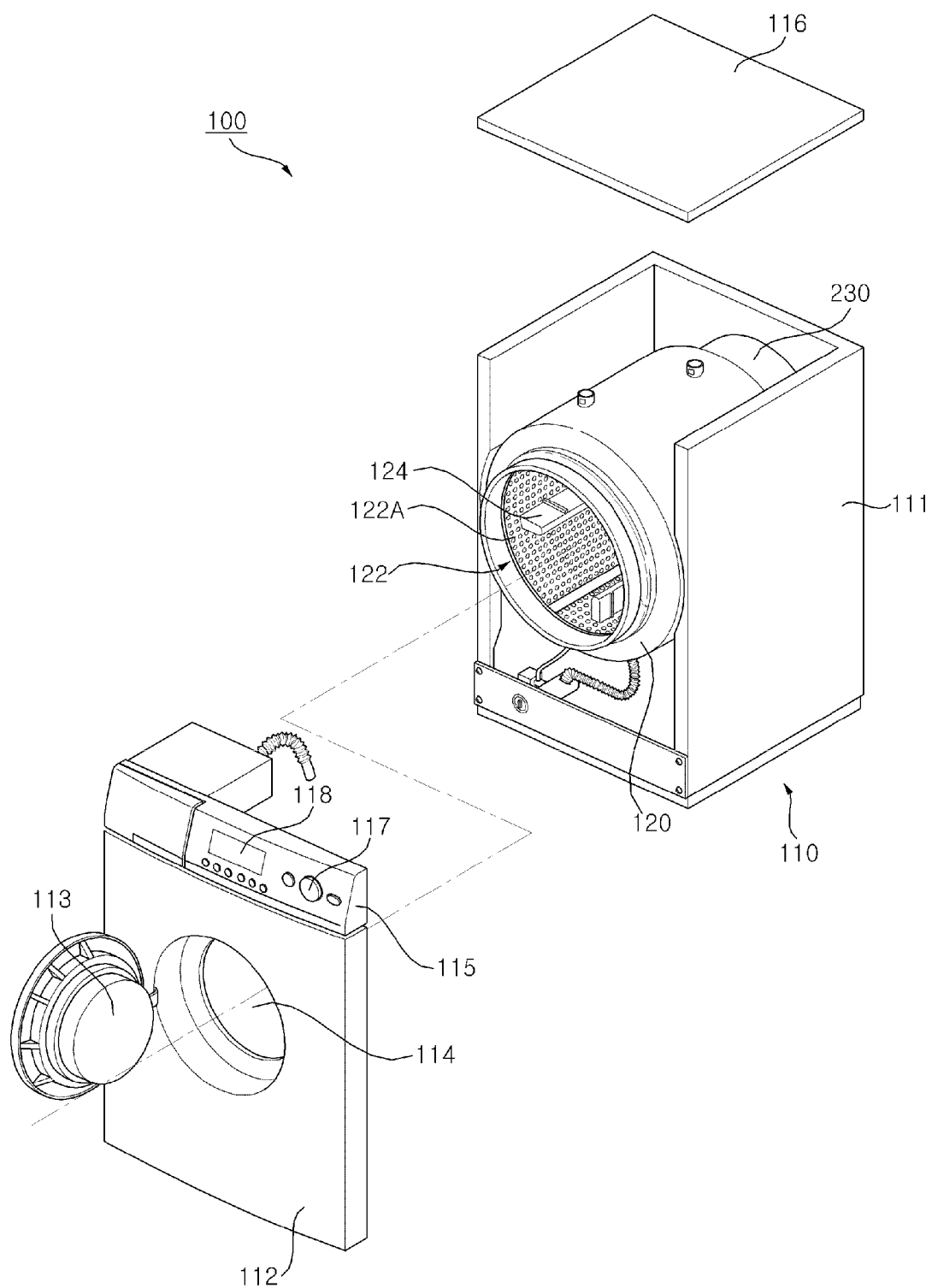
FIG. 1 is a perspective view showing a laundry treatment machine according to an embodiment of the present disclosure.

FIG. 1 is a perspective view showing a laundry treatment machine according to an embodiment of the present disclosure. A laundry treatment machine 100 according to an embodiment of the present disclosure is a front load type laundry treatment machine configured such that laundry is introduced into a washing tub from the front. The front load type laundry treatment machine includes a washing machine that washes, rinses, and spin-dries laundry introduced thereinto and a drying machine that dries wet laundry introduced thereinto.

The laundry treatment machine 100, e.g., a drum type laundry treatment machine, includes a cabinet 110 forming the external appearance or housing of the laundry treatment machine 100, and a tub 120 is disposed in the cabinet 110 such that the tub 120 is supported by the cabinet 110. A drum 122 is disposed in the tub 120 for washing laundry, and a motor 230 drives the drum 122. A wash water supply device (not shown) is disposed at the outside of a cabinet body 111 to supply wash water into the cabinet 110. A drainage device (not shown) is disposed at the lower side of the tub 120 to drain wash water to the outside.

The drum 122 may be provided with a plurality of through holes 122A, through which wash water flows. The drum 122 may be also provided at the inner circumference thereof with lifters 124 for raising laundry to a predetermined height such that the laundry drops due to gravity during rotation of the drum 122. The laundry treatment machine 100 may further include a vibration sensor for measuring vibration of the drum 122 or the cabinet 1110.

The cabinet 110 includes a cabinet body 111, and a cabinet cover 112 disposed at the front of the cabinet body 111 in a state in which the cabinet cover 112 is coupled to the cabinet body 111. The cabinet also includes a control panel 115 disposed at the upper side of the cabinet cover 112 in a state in which the control panel 115 is coupled to the cabinet body 111, and a top plate 116 disposed at the upper side of the control panel 115 in a state in which the top plate 116 is coupled to the cabinet body 111.

The cabinet cover 112 includes a port or opening 114 through which laundry is introduced into the drum 122. A door 113 is horizontally hinged to the cabinet cover 112 for opening and closing the port 114.

The control panel 115 includes manipulation keys 117 for allowing a user to manipulate an operation state of the laundry treatment machine 100. The control panel 115 may also include a display 118 disposed at one side of the manipulation keys 117 for displaying the operation state of the laundry treatment machine 100.

Figure 2:
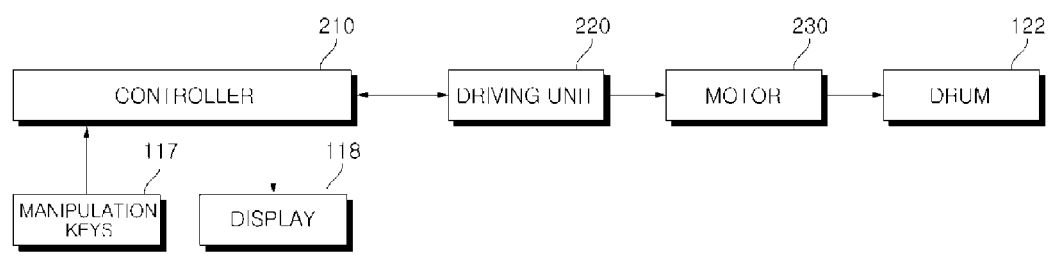
FIG. 2 is an internal block diagram of the laundry treatment machine shown in FIG. 1.

The manipulation keys 117 and the display 118 of the control panel 115 are electrically connected to a controller 210 (FIG. 2). The controller electrically controls components of the laundry treatment machine 100.

The drum 122 may be provided with an automatic balancer (not shown). The automatic balancer functions to reduce vibration generated from the drum 122 due to eccentricity of laundry received in the drum 122. A liquid balancer or a ball balancer may be used as the automatic balancer.

FIG. 2 is an internal block diagram of the laundry treatment machine shown in FIG. 1. A driving unit 220 of the laundry treatment machine 100 is controlled by a controller 210. The driving unit 220 drives a motor 230, which rotates the drum 122.

The controller 210 is operated according to an operation signal from the manipulation keys 117. Washing, rinsing, and spin-drying cycles of the laundry treatment machine 100 may be carried out based on input provided through the keys 117. The controller 210 may also control the display 118 to display a washing course, washing time, spin-drying time, rinsing time, or a current operation state.

The controller 210 may control the driving unit 220 to operate the motor 230. A position sensing unit for sensing the position of a rotor of the motor is not provided at the inside or the outside of the motor 230. Accordingly, the driving unit 220 controls the motor 230 in a sensorless mode.

The driving unit 220 drives the motor 230. The driving unit 220 may include an inverter 420 (FIG. 3), an inverter controller, an output current detection unit or current detector E (see FIG. 3) for detecting output current $i_o$ flowing in the motor 230, and an output voltage detection unit or voltage detector F (see FIG. 3) for detecting output voltage $V_o$ applied to the motor 230. In addition, the driving unit 220 may further include a converter for supplying a direct current (DC) voltage to be input the inverter.

For example, an inverter controller 430 (see FIG. 3) of the driving unit 220 estimates the position of the rotor of the motor 230 based on the output current $i_o$ and the output voltage $V_o$. The inverter 420 controls the motor 230 to be rotated based on the estimated position of the rotor.

The inverter controller 430 (see FIG. 3) generates a pulse width modulation (PWM)-based switching control signal $S_{ic}$ (see FIG. 3) based on the output current $i_o$ and the output voltage $V_o$ and outputs the generated switching control signal $S_{ic}$ to the inverter 420. The inverter performs a high-speed switching operation to supply AC voltage of a predetermined frequency to the motor 230. The motor 230 is rotated by the AC voltage of the predetermined frequency.

The controller 210 may sense laundry quantity based on the output current $i_o$ detected by the output current detection unit E. For example, the controller 210 may sense laundry quantity based on a current value $i_o$ of the motor 230 during rotation of the drum 122.

The controller 210 may also sense eccentric quantity of the drum 122, i.e. unbalance (UB) of the drum 122. The eccentric quantity of the drum 122 may be sensed based on a ripple component of the output current $i_o$ detected by the output current detection unit E or change quantity of rotational speed of the drum 122.

Figure 3:
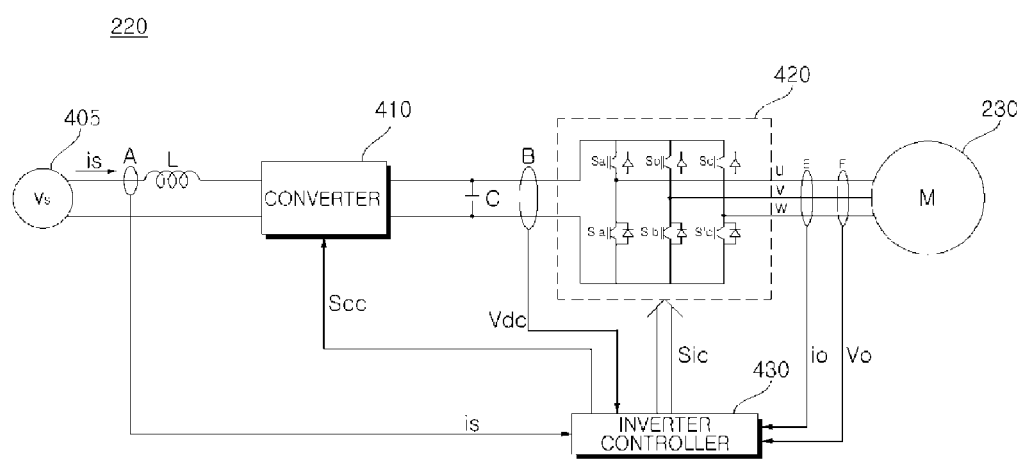
FIG. 3 is an internal circuit diagram of a driving unit shown in FIG. 2.

FIG. 3 is an internal circuit diagram of the driving unit shown in FIG. 2. The driving unit 220 according to the embodiment of the present disclosure drives a sensorless motor. The driving unit 220 may include a converter 410, an inverter 420, an inverter controller 430, a DC terminal voltage detection unit or DC voltage detector B, a smoothing capacitor C, an output current detection unit or an output current detector E, and an output voltage detection unit or, an output voltage detector F. In addition, the driving unit 220 may further include an input current detection unit or an input current detector A and an inductor L.

The inductor L is disposed between a commercial AC voltage source 405 ($V_s$) and the converter 410 for performing a power factor correction or boosting operation. In addition, the inductor L may function to restrict harmonic current due to high-speed switching of the converter 410.

The input current detection unit A may detect input current $i_s$ input from the commercial AC voltage source 405. A current transformer (CT) or a shunt resistor may be used as the input current detection unit A. The detected input current $i_s$, which is a pulse type discrete signal, may be input to the inverter controller 430.

The converter 410 converts voltage having output from the commercial AC voltage source 405 and passed through the inductor L into DC voltage and outputs the converted DC voltage. Although the commercial AC voltage source 405 is shown as a single phase AC voltage source in the drawing, the commercial AC voltage source 405 may be a three phase AC voltage source. The internal structure of the converter 410 is changed based on the type of the commercial AC voltage source 405.

The converter 410 may include only diodes without a switching device. In this case, the converter 410 may perform a rectification operation without an additional switching operation.

For example, four diodes may be arranged in the shape of a bridge for the single phase AC voltage source and six diodes may be arranged in the shape of a bridge for the three phase AC voltage source.

For example, a half-bridge type converter including two switching devices and four diodes connected to the switching devices may be used as the converter 410. On the other hand, six switching devices and six diodes may be used for the three phase AC voltage source.

In a case in which the converter 410 includes a switching device, boosting, power factor improvement, and DC voltage conversion may be performed according to a switching operation of the switching device.

The smoothing capacitor C smooths input voltage and stores the smoothed voltage. Although one smoothing capacitor C is shown in the drawing, a plurality of smoothing capacitors C may be provided to secure device stability.

Although the smoothing capacitor C is shown as being connected to the output terminal of the converter 410 in the drawing, DC voltage may be directly input to the smoothing capacitor C. For example, DC voltage from a solar cell may be directly input to the smoothing capacitor C or may be DC/DC converted and then input to the smoothing capacitor C.

Both terminals of the smoothing capacitor C may be referred to as DC terminals or DC link terminals since DC voltage is stored in the smoothing capacitor C.

The DC terminal voltage detection unit B may detect DC terminal voltage $V_{dc}$ applied between the both terminals of the smoothing capacitor C. The DC terminal voltage detection unit B may include a resistor and an amplifier. The detected DC terminal voltage $V_{dc}$, which is a pulse type discrete signal, may be input to the inverter controller 430.

The inverter 420 may include a plurality of inverter switching devices or transistors. The inverter 420 may convert the smoothed DC terminal voltage $V_{dc}$ into three phase AC voltages $V_a$, $V_b$, and $V_c$ of predetermined frequencies according to on/off operations of the switching devices and output the converted three phase AC voltages $V_a$, $V_b$, and $V_c$ to the motor 230 as a three phase synchronous motor.

In the inverter 420, first switching devices Sa, Sb, and Sc and second switching devices S'a, S'b, and S'c are connected in series to each other in pairs. As a result, three pairs of first and second switching devices Sa & S'a, Sb & S'b, and Sc & S'c are connected in parallel to one another. A diode is connected in reverse parallel to each of the switching devices Sa, S'a, Sb, S'b, Sc, and S'c.

The switching devices of the inverter 420 are turned on/off based on an inverter switching control signal $S_{ic}$ from the inverter controller 430. As a result, three phase AC voltages of predetermined frequencies are output to three phase synchronous motor 230.

The inverter controller 430 may control a switching operation of the inverter 420 in a sensorless mode. The inverter controller 430 may receive the output current $i_o$ detected by the output current detection unit E and the output voltage $V_o$ detected by the output voltage detection unit F.

The inverter controller 430 outputs the inverter switching control signal $S_{ic}$ to the inverter 420 so as to control the switching operation of the inverter 420. The inverter switching control signal $S_{ic}$, which is a PWM-based switching control signal, is generated and output based on the output current $i_o$ detected by the output current detection unit E and the output voltage $V_o$ detected by the output voltage detection unit F.

Output of the inverter switching control signal $S_{ic}$ from the inverter controller 430 will hereinafter be described in detail with reference to FIGS. 4A and 4B.

The output current detection unit E detects output current $i_o$ flowing between the inverter 420 and the three phase synchronous motor 230. That is, the output current detection unit E detects current flowing in the motor 230. The output current detection unit E may detect all three phase output currents $i_a$, $i_b$, and $i_c$. Alternatively, the output current detection unit E may detect two phase output currents using three phase equilibrium.

The output current detection unit E may be located between the inverter 420 and the motor 230. In order to detect current, a current transformer (CT) or a shunt resistor may be used as the output current detection unit E.

In a case in which a plurality of shunt resistors is used, three shunt resistors may be located between the inverter 420 and the synchronous motor 230 or one end of each of three shunt resistors may be connected to a corresponding one of the three second switching devices S'a, S'b, and S'c of the inverter 420. Alternatively, two shunt resistors may be used based on three phase equilibrium. In a case in which one shunt resistor is used, on the other hand, the shunt resistor may be disposed between the capacitor C and the inverter 420.

The detected output current $i_o$, which is a pulse type discrete signal, may be input to the inverter controller 430. An inverter switching control signal $S_{ic}$ is generated based on the detected output current $i_o$. In the following description, the detected output current $i_o$ may correspond to three phase output currents $i_a$, $i_b$, and $i_c$.

According to a sensorless position estimation method described in this specification, a position error is increased in a case in which the rotor position of the motor is estimated based on only output current detected by the output current detection unit E without using the output voltage detection unit F during a low-speed operation time period, which is a time period of 0 to 100 rpm. On the other hand, a position error is not increased during a high-speed operation time period, which is a time period of more than 100 rpm.

In the present disclosure, therefore, the output voltage detection unit F is used in addition to the output current detection unit E. The output voltage detection unit F is located between the inverter 420 and the motor 230 for detecting output voltage applied from the inverter 420 to the motor 230. In a case in which the inverter 420 is operated according to a PWM-based switching control signal, the output voltage may be PWM-based pulse type voltage. The detected PWM-based output voltage $V_o$, which is a pulse type discrete signal, may be applied to the inverter controller 430. An inverter switching control signal $S_{ic}$ is generated based on the detected output voltage $V_o$. In the following description, the detected output voltage $V_o$ may correspond to three phase AC voltages $V_a$, $V_b$, and $V_c$.

The three phase synchronous motor 230 may include stators and a rotor. All three phase AC voltages of predetermined frequencies are applied to coils of all three phase (a-phase, b-phase, and c-phase) stators to rotate the rotor.

For example, the motor 230 may include a Surface-Mounted Permanent-Magnet Synchronous Motor (SMPMSM), and Interior Permanent Magnet Synchronous Motor (IPMSM), and a Synchronous Reluctance Motor (SynRM). The SMPMSM and the IPMSM are Permanent Magnet Synchronous Motors (PMSM) each having a permanent magnet, whereas the SynRM is a motor having no permanent magnet.

In a case in which the converter 410 includes a switching device, the inverter controller 430 may control a switching operation of the switching device of the converter 410. The inverter controller 430 may receive the input current $i_s$ detected by the input current detection unit A. In addition, the inverter controller 430 may output a converter switching control signal $S_{cc}$ to the converter 410 so as to control a switching operation of the converter 410. The converter switching control signal $S_{cc}$, which is a PWM-based switching control signal, is generated and output based on the input current $i_s$ detected by the input current detection unit A.

Figure 4A:
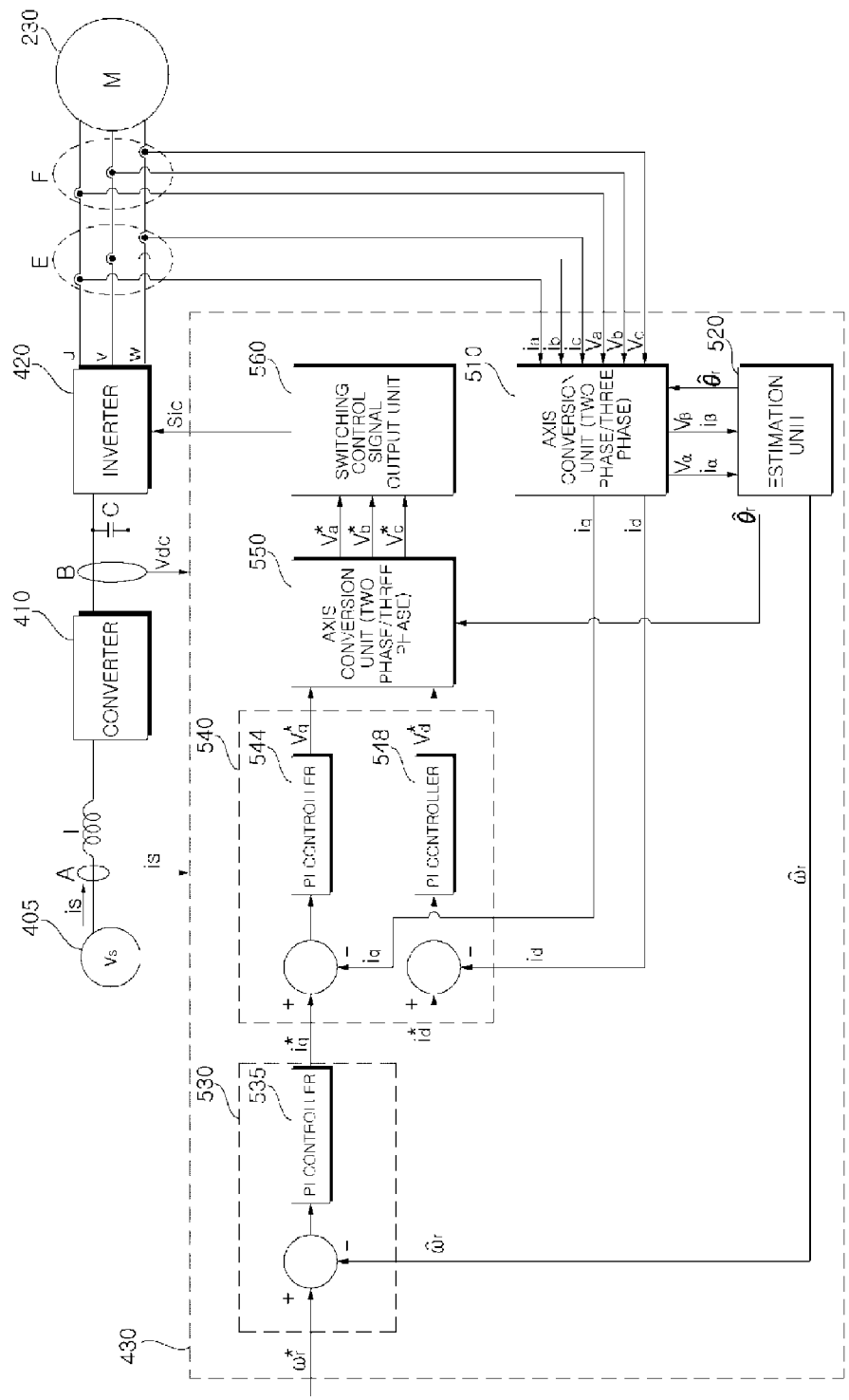
FIG. 4A is an internal block diagram of an inverter controller shown in FIG. 3.
Figure 4B:
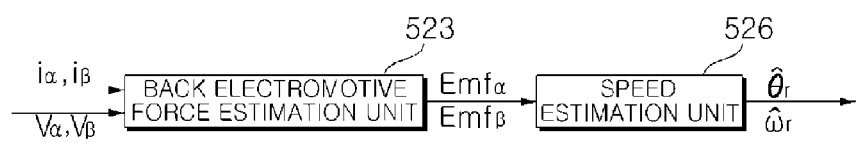
FIG. 4B is an internal block diagram of an estimation unit shown in FIG. 4A.

FIG. 4A is an internal block diagram of the inverter controller shown in FIG. 3 and FIG. 4B is an internal block diagram of an estimation unit shown in FIG. 4A.

Referring to FIG. 4A, the inverter controller 430 may include an axis conversion unit 510, an estimation unit 520, a current command generation unit 530, a voltage command generation unit 540, an axis conversion unit 550, and a switching control signal output unit 560.

The axis conversion unit 510 may receive the output currents $i_a$, $i_b$, and $i_c$ detected by the output current detection unit E and transform the received the output currents $i_a$, $i_b$, and $i_c$ into two phase currents $i_\alpha$ and $i_\beta$ of a stationary coordinate system and two phase currents $i_d$ and $i_q$ of a rotating coordinate system.

The axis conversion unit 510 receives the PWM-based output voltages $V_a$, $V_b$, and $V_c$ detected by the output voltage detection unit F to calculate a duty and calculates pole voltage $V_{pn}$ based on the calculated duty. Equation 1 below shows a pole voltage calculation method.

$$Vpn = \frac{1}{T}\int Vdc\,dt = Vdc\frac{Ton}{T} \qquad \text{[Equation 1]}$$

Where $V_{dc}$ indicates DC terminal voltage detected by the DC terminal voltage detection unit B, T indicates a control time period, i.e. a unit time period of a carrier signal for generating a PWM switching control signal, and $T_{on}$ indicates ON time, i.e. a duty, within a unit time period T.

The axis conversion unit 510 calculates three phase pole voltages $V_{un}$, $V_{vn}$, and $V_{wn}$ in response to the PWM-based three phase output voltages $V_a$, $V_b$, and $V_c$.

The axis conversion unit 510 may also calculate offset voltage $V_{offset}$ using the three phase pole voltages $V_{un}$, $V_{vn}$, and $V_{wn}$ as represented by Equation 2.

$$Voffset = (Vun+Vvn+Vwn)/3 \qquad \text{[Equation 2]}$$

The axis conversion unit 510 may also calculate three phase voltages $V_{as}$, $V_{bs}$, and $V_{cs}$ applied to the respective phases of the motor 230 using the three phase pole voltages $V_{un}$, $V_{vn}$, and $V_{wn}$ and the offset voltage $V_{offset}$ as represented by Equation 3.

$$Vas = Vun - Voffset$$

$$Vbs = Vvn - Voffset$$

$$Vcs = Vwn - Voffset \quad \text{[Equation 3]}$$

The axis conversion unit 510 may also calculate two phase voltages $V_\alpha$ and $V_\beta$ of a stationary coordinate system using the three phase voltages $V_{as}$, $V_{bs}$, and $V_{cs}$ as represented by Equation 4. On the other hand, the axis conversion unit 510 may transform the two phase voltages $V_\alpha$ and $V_\beta$ of the stationary coordinate system into two phase voltages $V_d$ and $V_q$ of a rotating coordinate system.

$$\begin{bmatrix} V_\alpha \\ V_\beta \end{bmatrix} = \begin{bmatrix} 1 & 0 & 0 \\ 0 & 1/\sqrt{3} & -1/\sqrt{3} \end{bmatrix} \begin{bmatrix} V_{as} \\ V_{bs} \\ V_{cs} \end{bmatrix} \quad \text{[Equation 4]}$$

The axis conversion unit 510 may output the transformed two phase currents $i_\alpha$ and $i_\beta$ of the stationary coordinate system, the transformed two phase voltages $V_\alpha$ and $V_\beta$ of the stationary coordinate system, the transformed two phase currents $i_d$ and $i_q$ of the rotating coordinate system, and the transformed two phase voltages $V_d$ and $V_q$ of the rotating coordinate system to the outside.

The estimation unit 520 may receive the axis-transformed two phase currents $i_\alpha$ and $i_\beta$ of the stationary coordinate system and the axis-transformed two phase voltages $V_\alpha$ and $V_\beta$ of the stationary coordinate system from the axis conversion unit 510 to estimate a rotor position $\theta$ and speed $\omega$ of the motor 230.

Referring to FIG. 4B, the estimation unit 520 may include a back electromotive force estimation unit 523 for estimating back electromotive force caused in the motor 230 and a speed estimation unit 526 for estimating a rotor position $\hat{\theta}_r$ and speed $\hat{\omega}_r$ of the motor 230.

The back electromotive force estimation unit 523 may receive the two phase currents $i_\alpha$ and $i_\beta$ of the stationary coordinate system and the two phase voltages $V_\alpha$ and $V_\beta$ of the stationary coordinate system from the axis conversion unit 510 to estimate two phase back electromotive forces $Emf_\alpha$ and $Emf_\beta$ of the stationary coordinate system using a back electromotive force observer based on the stationary coordinate system.

Meanwhile, the two phase back electromotive forces $Emf_\alpha$ and $Emf_\beta$ of the stationary coordinate system may be expressed as a function for the rotational speed and rotor position of the motor as represented by Equation 5.

$$\begin{bmatrix} Emf_\alpha \\ Emf_\beta \end{bmatrix} = \begin{bmatrix} \omega_r \lambda \sin\theta_r \\ -\omega_r \lambda \cos\theta_r \end{bmatrix} \quad \text{[Equation 5]}$$

Where $\omega_r$ indicates a rotational speed of the motor, $\theta_r$ indicates a rotor position of the motor, and $\lambda$ indicates observed magnetic flux.

Meanwhile, the speed estimation unit 526 may estimate the rotor position $\hat{\theta}_r$ of the motor 230 through arctangent calculation using the estimated back electromotive forces $Emf_\alpha$ and $Emf_\beta$ as represented by Equation 6.

$$\hat{\theta}_r = \tan^{-1}\left(\frac{-Emf_\alpha}{Emf_\beta}\right) = \tan^{-1}\left(\frac{\omega_r \lambda \sin\theta_r}{\omega_r \lambda \cos\theta_r}\right) \quad \text{[Equation 6]}$$

Meanwhile, the speed estimation unit 526 may estimate the rotor position $\hat{\theta}_r$ and speed $\hat{\omega}_r$ of the motor 230 using an all dimensional speed observer after the arctangent calculation.

As a result, the estimation unit 520 may output the estimated position $\hat{\theta}_r$ and the estimated speed $\hat{\omega}_r$ based on the input two phase currents $i_\alpha$ and $i_\beta$ of the stationary coordinate system and the input two phase voltages $V_\alpha$ and $V_\beta$ of the stationary coordinate system.

The current command generation unit 530 generates a current command value $i^*_q$ based on the estimated speed $\hat{\omega}_r$ and a speed command value $\omega^*_r$. For example, a PI (Proportional-Integral) controller 535 of the current command generation unit 530 may perform PI control based on a difference between the estimated speed $\hat{\omega}_r$ and the speed command value $\omega^*_r$ to generate a current command value $i^*_q$. Although a q-axis current command value $i^*_q$ is shown as the current command value in the drawing, it is possible to generate a d-axis current command value $i^*_d$ together with the q-axis current command value $i^*_q$. The d-axis current command value $i^*_d$ may be set to 0.

Meanwhile, the speed command value $\omega^*_r$ may be manually set according to operation signal from the manipulation keys 117 or automatically set according to washing, rinsing, or spin-drying cycles of the laundry treatment machine 100.

The current command generation unit 530 may further include a limiter for limiting a level of the current command value $i^*_q$ such that the current command value $i^*_q$ does not exceed an allowable range.

The voltage command generation unit 540 may generate d-axis and q-axis voltage command values $V^*_d$ and $V^*_q$ based on d-axis and q-axis currents $i_d$ and $i_q$ axis-transformed into a two phase rotating coordinate system by the axis conversion unit and the current command value $i^*_d$ and $i^*_q$ generated by the current command generation unit 530. For example, a PI controller 544 of the voltage command generation unit 540 may perform PI control based on a difference between the q-axis current $i_q$ and the q-axis current command value $i^*_q$ to generate a q-axis voltage command value $V^*_q$.

In addition, a PI controller 548 of the voltage command generation unit 540 may perform PI control based on a difference between the d-axis current $i_d$ and the d-axis current command value $i^*_d$ to generate a d-axis voltage command value $V^*_d$. The d-axis voltage command value $V^*_d$ may be set to 0 in response to a case in which the d-axis current command value $i^*_d$ is set to 0.

The voltage command generation unit 540 may further include a limiter for limiting levels of the d-axis and q-axis voltage command values $V^*_d$ and $V^*_q$ such that the d-axis and q-axis voltage command values $V^*_d$ and $V^*_q$ do not exceed allowable ranges. The generated d-axis and q-axis voltage command values $V^*_d$ and $V^*_q$ are input to the axis conversion unit 550.

The axis conversion unit 550 receives the estimated position $\hat{\theta}_r$ and the d-axis and q-axis voltage command values $V^*_d$ and $V^*_q$ from the estimation unit 520 to perform axis transformation. The axis conversion unit 550 performs transformation from a two phase rotating coordinate system to a two phase stationary coordinate system. At this time, the position $\hat{\theta}_r$ estimated by the estimation unit 520 may be used.

Subsequently, the axis conversion unit 550 performs transformation from the two phase stationary coordinate system to a three phase stationary coordinate system. As a result, the axis conversion unit 550 outputs three phase output voltage command values V*a, V*b, and V*c.

The switching control signal output unit 560 generates and outputs a PWM-based inverter switching control signal $S_{ic}$ based on the three phase output voltage command values V*a, V*b, and V*c.

The output inverter switching control signal $S_{ic}$ may be converted into a gate driving signal by a gate driving unit and then input to a gate of each switching device of the inverter 420. As a result, the respective switching devices Sa, S'a, Sb, S'b, Sc, and S'c of the inverter 420 may perform switching operations.

Figure 5:
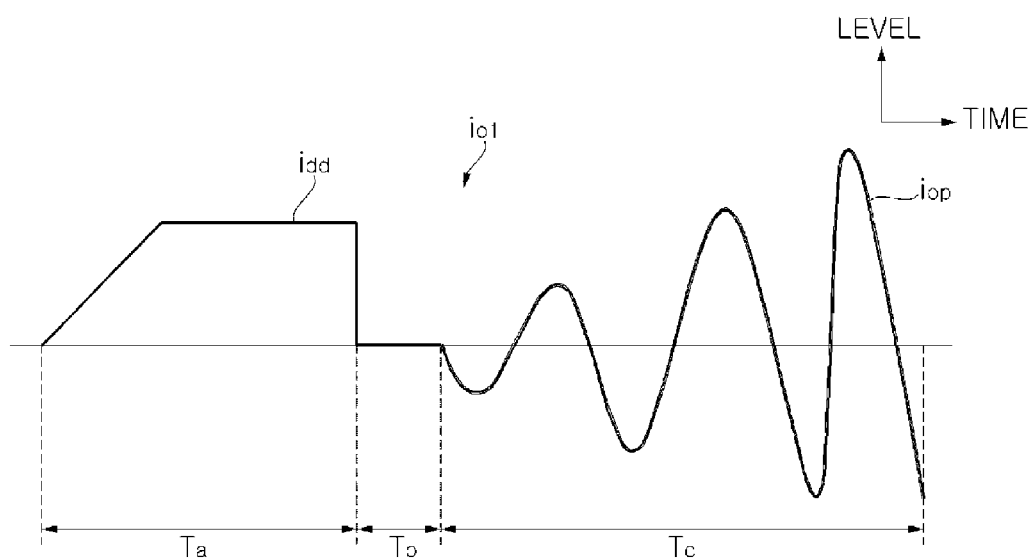
FIG. 5 is a view showing an example of alternating current (AC) current supplied to a motor shown in FIG. 3.

FIG. 5 is a view showing an example of alternating current (AC) current supplied to the motor shown in FIG. 3 and FIG. 6 is a view illustrating the position of laundry in the drum in response to the current supplied to the motor shown in FIG. 5. According to switching operation of the inverter 420, current flows in the motor 230 as shown in FIG. 5.

Specifically, an operation time period of the motor 230 may be divided into a starting operation time period $T_a$ for aligning the rotor of the motor and a normal operation time period $T_c$ for normally rotating the motor. A pause time period $T_b$ may be provided between the starting operation time period $T_a$ and the normal operation time period $T_c$.

During the starting operation time period $T_a$, a constant current $i_{dd}$ may be supplied to the motor 230 so as to align the rotor of the motor 230. The inverter controller 430 may control a constant alignment current to be supplied to the motor 230 so as to align the rotor of the motor 230 for rotating the drum 122 during the starting operation time period $T_a$. For example, a d-axis current command value of the alignment current may be a predetermined value and a q-axis current command value of the alignment current may be 0.

During the starting operation time period $T_a$, the inverter controller 430 may set the estimated speed $\hat{\omega}_r$ to be 0 such that the q-axis current command value $i^*_q$ is 0 and set the d-axis current command value $i^*_d$ to be a specific value. And the inverter controller 430 may output the inverter switching control signal $S_{ic}$ based on the d-axis current command value $i^*_d$. Thus, the constant current $i_{dd}$ may be supplied to the motor 230.

During the pause time period $T_b$, the inverter controller 430 may not output the inverter switching control signal $S_{ic}$.

During the normal operation time period $T_c$, on the other hand, a predetermined AC current $i_{op}$ may be supplied to the motor 230 so as to rotate the motor 230 at a constant speed or at an accelerated speed. The inverter controller 430 may control output current corresponding to a predetermined d-axis current command value and a predetermined q-axis current command value to be supplied to the motor 230 so as to rotate the drum 122 at a constant speed or at an accelerated speed during the normal operation time period $T_c$.

During the normal operation time period $T_c$, the inverter controller 430 may generate current command values $I^*_d$ and $I^*_q$ based on the estimated speed $\hat{\omega}_r$ not to be 0, generate voltage command values $V^*_d$ and $V^*_q$ based on the current command values $I^*_d$ and $I^*_q$ generate and output the inverter switching control signal $S_{ic}$ based on the voltage command values $V^*_d$ and $V^*_q$. Thus, the predetermined AC current $i_{op}$ may be supplied to the motor 230 so as to rotate the motor 230 at a constant speed or at an accelerated speed.

Figure 6A:
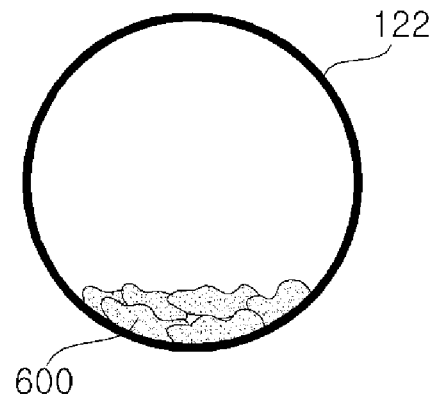
FIGS. 6(a)-6(c) is a view illustrating the position of laundry in a drum in response to the current supplied to the motor shown in FIG. 5.
Figure 6B:
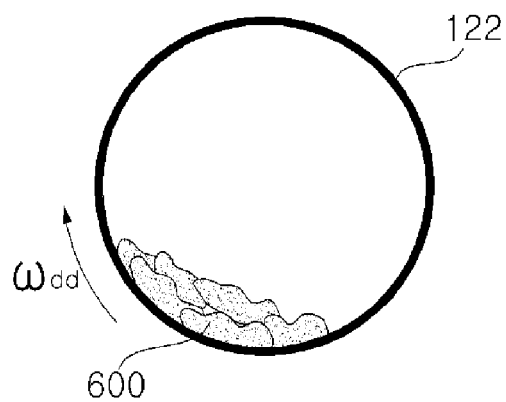
Figure 6C:
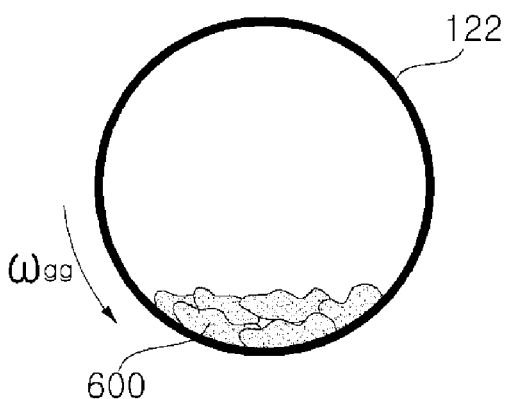

FIG. 6(a) exemplarily shows that laundry 600 is placed in the drum 122 and an alignment current has not yet been supplied to the motor 230 during the starting operation time period $T_a$. FIG. 6(b) is a view, corresponding to the starting operation time period $T_a$ of FIG. 5, exemplarily showing that an alignment current is supplied to the motor 230 and, therefore, the motor 230 is rotated at a predetermined speed $\omega_{dd}$ in the left direction. FIG. 6(c) exemplarily shows that no current is supplied to the motor 230 during the pause time period $T_b$ of FIG. 5 and the motor 230 is rotated at a speed $\omega_{gg}$ corresponding to gravity in the right direction due to gravity corresponding to the laundry 600.

In this case, the rotor of the motor is misaligned. Particularly, in a sensorless driving mode, an error is generated when the position of the rotor of the motor is estimated and current command and voltage command for normal rotation are generated based on erroneous position estimation with the result that torque generated afterwards is adversely affected and, therefore, reliability of normal operation is lowered.

On the other hand, in a case in which the supply of the alignment current to the motor 230 is stopped after the starting operation time period $T_a$ until a predetermined current is supplied to the motor 230 during the normal operation time period although the pause time period $T_b$ is not provided between the starting operation time period $T_a$ and the normal operation time period $T_c$ unlike FIG. 5, the problem as shown in FIG. 6(c) is caused.

The alignment current is continuously supplied to the motor 230 until the drum is rotated so as to solve the above problem, which will hereinafter be described with reference to FIG. 7.

Figure 7:
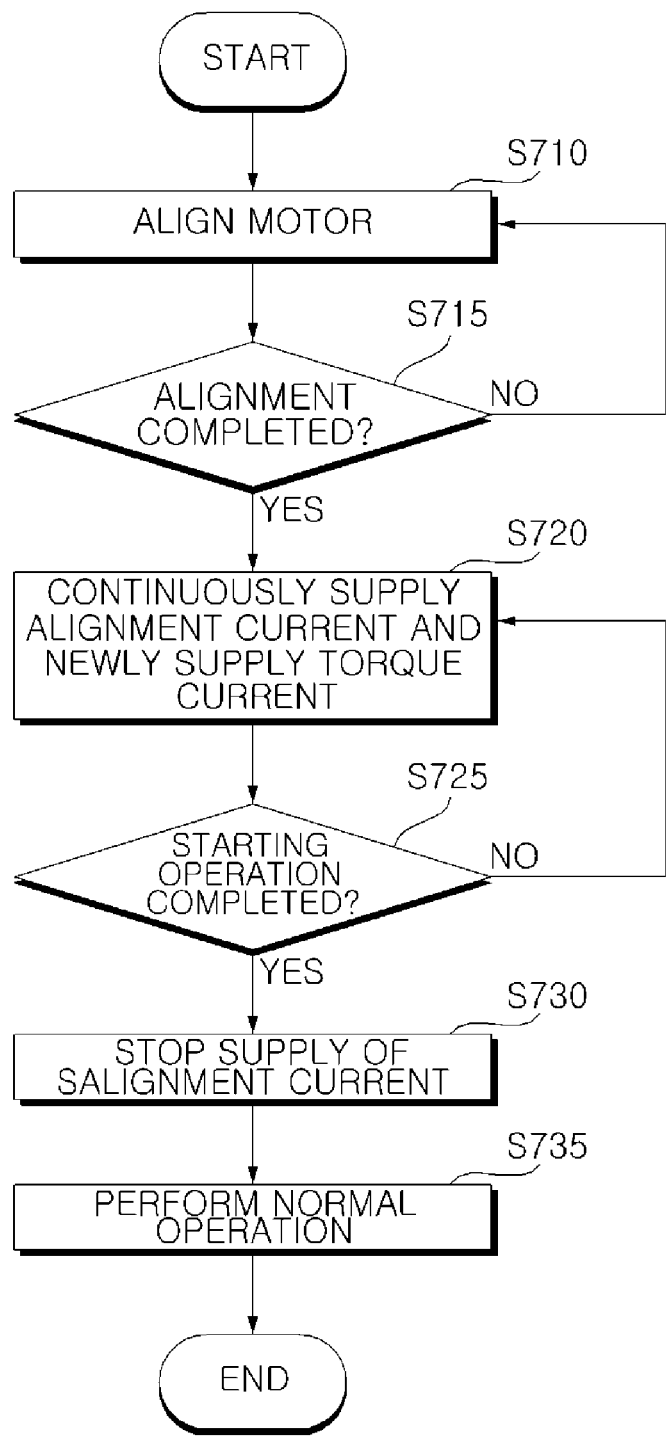
FIG. 7 is a flowchart showing an operation method of a laundry treatment machine according to an embodiment of the present disclosure.
Figure 8:
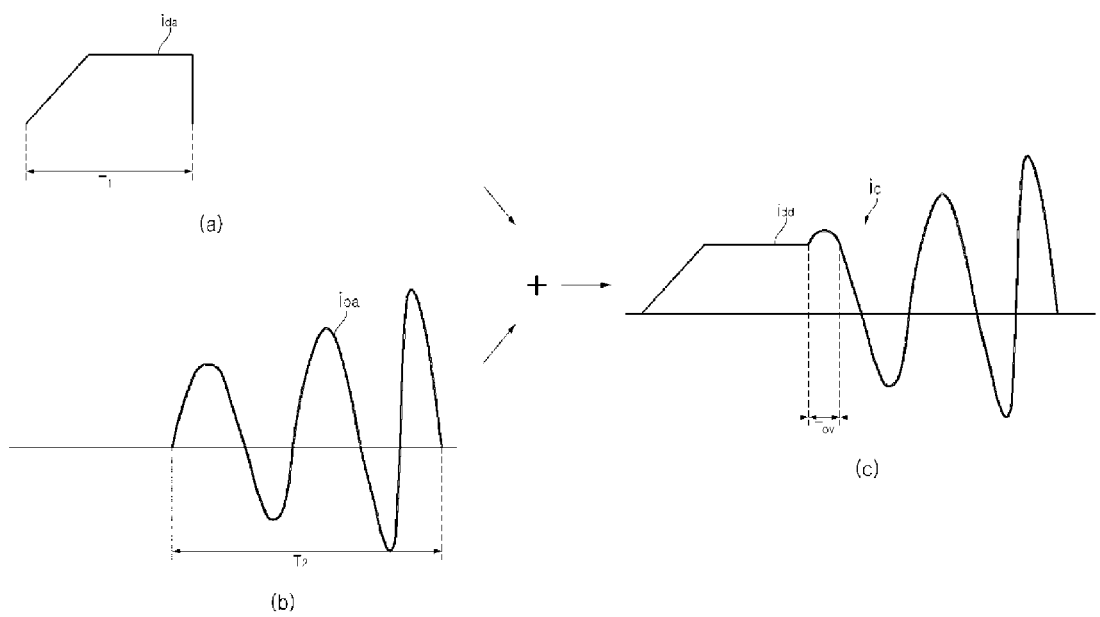
FIG. 8 is a view showing an example of AC current supplied to a motor according to the operation method shown in FIG. 7.

FIG. 7 is a flowchart showing an operation method of a laundry treatment machine according to an embodiment of the present disclosure, FIG. 8 is a view showing an example of AC current supplied to the motor according to the operation method shown in FIG. 7, and FIG. 9 is a view illustrating the position of laundry in the drum in response to the current supplied to the motor shown in FIG. 8.

Referring to FIG. 7, the motor driving unit 220 aligns the motor 230 during a starting operation time period $T_1$ (S710). For alignment of the motor 230, the inverter controller 430 controls a constant current to be supplied to the motor 230. Specifically, the inverter controller 430 controls a d-axis current, which is a flux current, to have a constant value and a q-axis current, which is a torque current, to have a value of 0. In addition, the inverter controller 430 controls the inverter 420 to supply current equivalent to the flux current to the motor 230.

FIG. 8(a) exemplarily shows that a constant current $i_{da}$ is supplied to the motor 230 during the starting operation time period $T_1$.

During the starting operation time period $T_1$, the inverter controller 430 may set the estimated speed $\hat{\omega}_r$ to be 0 such that the q-axis current command value $i^*_q$ is 0 and set the d-axis current command value $i^*_d$ to be a specific value. And the inverter controller 430 may output the inverter switching control signal $S_{ic}$ based on the d-axis current command value $i^*_d$. Thus, the constant current $i_{da}$ may be supplied to the motor 230.

Figure 9A:
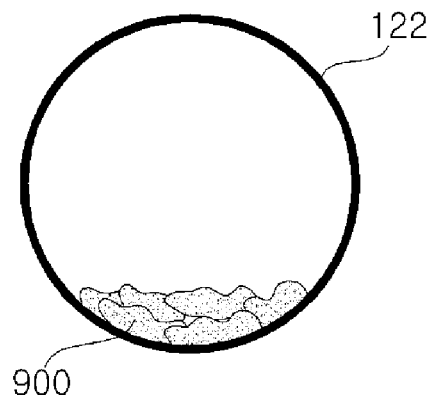
FIGS. 9(a)-9(c) is a view illustrating the position of laundry in a drum in response to the current supplied to the motor shown in FIG. 8.

FIG. 9(a) exemplarily shows that laundry 900 is placed in the drum 122 and an alignment current $i_{da}$ has not yet been supplied to the motor 230 during the starting operation time period $T_1$.

Figure 9B:
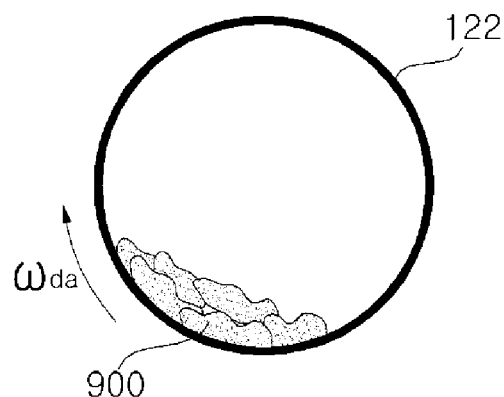

FIG. 9(b) is a view, corresponding to the starting operation time period $T_1$ of FIG. 8(a), exemplarily showing that an alignment current $i_{da}$ is supplied to the motor 230 and, therefore, the drum 122, in which the laundry 900 is placed, is rotated at a predetermined speed $\omega_{da}$ in the left direction.

Subsequently, the inverter controller 430 of the motor driving unit 220 determines whether alignment of the motor has been completed (S715). Upon determining that alignment of the motor has been completed, the motor driving unit 220 newly supplies a torque current $i_{oa}$ to the motor 230 while continuously supplying the alignment current $i_{da}$ to the motor 230 (S720).

FIG. 8(b) exemplarily shows the torque current $i_{oa}$ supplied to the motor 230 during a normal operation time period $T_2$. When alignment of the motor has been completed, the inverter controller 430 of the motor driving unit 220 supplies the torque current $i_{oa}$ to the motor 230 while continuously supplying the alignment current $i_{da}$ to the motor 230 such that the motor 230 is prevented from being rotated in the right direction due to gravity corresponding to the laundry unlike FIG. 6(c).

The inverter controller 430 controls a d-axis current $i_d$, which is a flux current, to have a constant value and a q-axis current $I_q$, which is a torque current, to have a gradually increased value, not 0. In addition, the inverter controller 430 controls the inverter 420 to supply current equivalent to the flux current and the torque current to the motor 230.

During the normal operation time period $T_2$, the inverter controller 430 may generate current command values $I^*_d$ and $I^*_q$ based on the estimated speed $\hat{\omega}_r$ not to be 0. Here, the inverter controller 430 may control a d-axis command current $I^*_d$, which is a flux current, to have a constant value and a q-axis command current $I^*_q$, which is a torque current, to have a gradually increased value, not 0. And, the inverter controller 430 may generate voltage command values $V^*_d$ and $V^*_q$ based on the current command values $I^*_d$ and $I^*_q$, generate and output the inverter switching control signal $S_{ic}$ based on the voltage command values $V^*_d$ and $V^*_q$. Thus, the torque current $i_{oa}$ may be supplied to the motor 230 so as to rotate the motor 230 and prevent a reverse rotation phenomenon of the drum 122 due to the laundry 900.

The alignment current $i_{da}$ and the torque current $i_{oa}$ are supplied to the motor 230 in an overlapping state such that the motor 230 is prevented from being rotated in the right direction due to gravity corresponding to the laundry unlike FIG. 6(c).

FIG. 8(c) exemplarily shows an overlapping time period $T_{ov}$ in which the alignment current $i_{da}$ and the torque current $i_{oa}$ overlap each other. In a case in which the overlapping time period $T_{ov}$ is provided, the motor 230 is prevented from being rotated in the right direction due to gravity corresponding to the laundry unlike FIG. 6(c). That is, it is possible to prevent a reverse rotation phenomenon of the drum 122 due to the laundry 900.

Figure 9C:
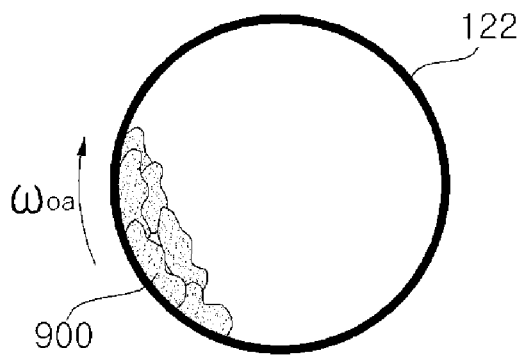

FIG. 9(c) exemplarily shows that the drum 122, in which the laundry 900 is placed, is rotated at a predetermined speed $\omega_{oa}$ in the left direction due to the alignment current $i_{da}$ and the torque current $i_{oa}$ of FIG. 8. At this time, the speed $\omega_{oa}$ is greater than the speed $\omega_{da}$ of FIG. 9(b).

Subsequently, the inverter controller 430 of the motor driving unit 220 determines whether the starting operation has been completed (S725). Upon determining that the starting operation has been completed, the inverter controller 430 of the motor driving unit 220 stops the supply of the alignment current to the motor 230 (S730) and then performs normal operation (S735).

The inverter controller 430 of the motor driving unit 220 may determine whether the starting operation has succeeded based on at least one selected from between rotation time and rotational speed of the motor 230 and, upon determining that the starting operation has succeeded, may control the alignment current $i_{da}$ not to be supplied to the motor 230 and only the torque current $i_{oa}$ to be supplied to the motor 230. The motor 230 may be rotated in response to the normal operation.

Upon determining that the drum 122 is stably rotated for a predetermined period of time or more, the inverter controller 430 may determine that the starting operation has succeeded. Alternatively, upon determining that the drum 122 is stably rotated at a predetermined speed or more, the inverter controller 430 may determine that the starting operation has succeeded.

Upon determining that the starting operation has succeeded, the inverter controller 430 may stop the supply of the alignment current to the motor 230. The inverter controller 430 may stop the supply of the d-axis current having the constant value to the motor 230. As a result, the inverter controller 430 may control current equivalent to the q-axis current, which is the torque current, to be supplied to the motor 230. Alternatively, the inverter controller 430 may control current equivalent to a variable d-axis current and the q-axis current to be supplied to the motor 230. As a result, the motor 230 may be rotated in response to the normal operation.

In a case in which the overlapping time period $T_{ov}$, in which the alignment current $i_{da}$ and the torque current $i_{oa}$ overlap each other, is provided as described above, angle estimation is carried out based on a sensorless algorithm in a state in which a designated angle is maintained during the starting operation. Consequently, it is possible to perform a stable sensorless starting operation.

The current command generation unit 530 of the inverter controller 430 may set the d-axis current command value $i^*_d$ to a constant value so as to generate the alignment current $i_{da}$. On the other hand, the current command generation unit 530 of the inverter controller 430 may set the q-axis current command value $i^*_q$ to a gradually increasing value so as to generate the torque current $i_{oa}$.

Meanwhile, the motor driving method or the operation method of the laundry treatment machine according to the embodiments of the present disclosure may be realized as code, which is readable by a processor included in the motor driving apparatus or the laundry treatment machine, in recording media readable by the processor. The recording media readable by the processor includes all kinds of recording devices to store data which are readable by the processor.

As is apparent from the above description, in the motor driving apparatus and the laundry treatment machine including the same according to the embodiments of the present disclosure, an alignment current is supplied to the motor so as to align the motor during a starting operation of the motor and a torque current for rotating the motor is supplied to the motor together with the alignment current after the motor is aligned. Consequently, it is possible to prevent a reverse rotation phenomenon of the drum due to the laundry placed in the drum.

In addition, the overlapping time period, in which the alignment current and the torque current overlap each other, is provided. As a result, angle estimation is carried out based on a sensorless algorithm in a state in which a designated angle is maintained during the starting operation. Consequently, it is possible to perform a stable sensorless starting operation.

Meanwhile, PWM-based output voltage is detected, a rotor position and speed of the motor are estimated based on the detected output voltage, and a switching control signal for controlling the inverter is output based on the estimated rotor position and speed of the motor. Consequently, it is possible to accurately control the motor in a sensorless mode.

The disclosed motor driving apparatus is capable of preventing a reverse rotation phenomenon of a drum due to load and a laundry treatment machine including the same.

A laundry treatment machine may include a drum, a motor to rotate the drum, and a driving unit to drive the motor, wherein the driving unit includes an inverter to convert direct current (DC) voltage into alternating current (AC) voltage and to output the AC voltage to the motor and an inverter controller to control the inverter to supply an alignment current to the motor so as to align the motor during a starting operation of the motor and to supply a torque current for rotating the motor to the motor together with the alignment current after the motor is aligned.

A laundry treatment machine may include a drum, a motor to rotate the drum, and a driving unit to drive the motor, wherein the driving unit includes an inverter to convert DC voltage into AC voltage and to output the AC voltage to the motor and an inverter controller to control the inverter to supply an alignment current to the motor so as to align the motor during a starting operation of the motor and to supply a torque current for rotating the motor to the motor during a normal operation of the motor, and wherein a time period for supplying the alignment current and a time period for supplying the torque current overlap each other.

A motor driving apparatus may include an inverter to convert DC voltage into AC voltage and to output the AC voltage to the motor and an inverter controller to control the inverter to supply an alignment current to the motor so as to align the motor during a starting operation of the motor and to supply a torque current for rotating the motor to the motor together with the alignment current after the motor is aligned.

This application is related to U.S. application Ser. Nos. 14/535,702, 14/536,004, and 14/535,595, filed on Nov. 7, 2014, whose entire disclosures are incorporated herein by reference.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treatment machine comprising:
    a drum;
    a motor to rotate the drum; and
    a driving circuit to drive the motor, wherein the driving circuit comprises:
        an inverter to convert direct current (DC) voltage into alternating current (AC) voltage and to output the AC voltage to the motor; and
        an inverter controller to control the inverter to supply an alignment current to the motor so as to align the motor during a starting operation of the motor and to supply a torque current for rotating the motor together with the alignment current after the motor is aligned,
        wherein the inverter controller controls the inverter such that a first time period for supplying the alignment current and a second time period for supplying the torque current overlap each other.

2. The laundry treatment machine according to claim 1, wherein the inverter controller controls the inverter not to supply the alignment current to the motor and to supply the torque current to the motor when the starting operation of the motor is completed.

3. The laundry treatment machine according to claim 1, wherein the inverter controller controls the inverter such that the torque current is gradually increased.

4. The laundry treatment machine according to claim 1, wherein the inverter controller controls current equivalent to a flux current having a constant value to be supplied to the motor as the alignment current.

5. The laundry treatment machine according to claim 1, further comprising:
    an output voltage detector to detect output voltage applied to the motor; and
    an output current detector to detect output current flowing in the motor,
    wherein the inverter controller estimates a rotor position of the motor based on the detected output current and pulse width modulation (PWM)-based output voltage detected by the output voltage detector and outputs an inverter switching control signal for controlling the inverter based on the estimated rotor position of the motor.

6. The laundry treatment machine according to claim 1, further comprising:
    an output voltage detector to detect output voltage applied to the motor; and
    an output current detector to detect output current flowing in the motor,
    wherein the inverter controller includes:
        an estimation circuitry to estimate a rotor position and speed of the motor based on the detected output current and PWM-based output voltage detected by the output voltage detector;
        a current command generator to generate a current command value based on the estimated speed of the motor and a speed command value;
        a voltage command generator to generate a voltage command value based on the current command value and the detected output current; and
        a switching control signal output circuitry to output a switching control signal for driving the inverter based on the voltage command value.

7. The laundry treatment machine according to claim 6, wherein the estimation circuitry comprises:
    a back electromotive force estimation module to estimate back electromotive force generated from the motor based on the detected output current and the detected PWM-based output voltage; and a speed estimation module to estimate the rotor position and speed of the motor based on the estimated back electromotive force.

8. The laundry treatment machine according to claim 1, wherein the inverter controller further controls the inverter to supply with the alignment current with a positive constant value during a portion of the first time period.

9. The laundry treatment machine according to claim 8, wherein the inverter controller controls the inverter to supply with the torque current to periodically change between a positive value and a negative value during the second time period, and wherein the inverter controller further controls the inverter to supply with the torque current with the positive value during the portion of the second time period that overlaps the first time period.

10. The laundry treatment machine according to claim 1, wherein:
the alignment current causes the motor to apply force to the drum in a first direction during the first time period, and
the torque current causes the motor to sequentially apply force to the drum in the first direction and a second direction that is opposite to the first direction during the second time period, and the torque current causing the motor to apply force only in the first direction during an overlap of the first time period and the second time period.

11. A motor driving apparatus comprising:
an inverter to convert DC voltage into AC voltage and to output the AC voltage to a motor; and
an inverter controller to control the inverter to supply an alignment current having positive value to the motor so as to align the motor during a starting operation of the motor and to supply a torque current for rotating the motor together with the alignment current after the motor is aligned,
wherein the inverter controller controls the inverter such that a first time period for supplying the alignment current and a second time period for supplying the torque current overlap each other.

12. The motor driving apparatus according to claim 11, wherein the inverter controller controls the inverter not to supply the alignment current to the motor and to supply the torque current to the motor when the starting operation of the motor is completed.

13. The motor driving apparatus according to claim 12, wherein the inverter controller determines whether the starting operation has been completed based on at least one selected from between rotation time and rotational speed of the motor.

14. The motor driving apparatus according to claim 11, wherein the inverter controller controls current equivalent to a flux current having a constant value to be supplied to the motor as the alignment current.

15. The motor driving apparatus according to claim 11, further comprising:
an output voltage detector to detect output voltage applied to the motor; and
an output current detector to detect output current flowing in the motor, wherein the inverter controller estimates a rotor position of the motor based on the detected output current and PWM-based output voltage detected by the output voltage detector and outputs an inverter switching control signal for controlling the inverter based on the estimated rotor position of the motor.

16. The motor driving apparatus according to claim 11, further comprising:
an output voltage detector to detect output voltage applied to the motor; and
an output current detector to detect output current flowing in the motor,
wherein the inverter controller includes:
an estimation module to estimate a rotor position and speed of the motor based on the detected output current and PWM-based output voltage detected by the output voltage detector;
a current command generation module to generate a current command value based on the estimated speed of the motor and a speed command value;
a voltage command generation module to generate a voltage command value based on the current command value and the detected output current; and
a switching control signal output module to output a switching control signal for driving the inverter based on the voltage command value.

17. The motor driving apparatus according to claim 16, wherein the estimation module comprises:
a back electromotive force estimation module to estimate back electromotive force generated from the motor based on the detected output current and the detected PWM-based output voltage; and
a speed estimation module to estimate the rotor position and speed of the motor based on the estimated back electromotive force.

18. The motor driving apparatus according to claim 11, wherein the inverter controller further controls the inverter to supply with the alignment current with a positive constant value during a portion of the first time period.

19. The motor driving apparatus according to claim 18, wherein the inverter controller controls the inverter to supply with the torque current to periodically change between a positive value and a negative value during the second time period, and wherein the inverter controller further controls the inverter to supply with the torque current with the positive value during the portion of the second time period that overlaps the first time period.

20. The motor driving apparatus according to claim 11, wherein:
the alignment current causes a motor to apply force in a first direction during the first time period, and
the torque current causes the motor to sequentially apply force in the first direction and a second direction that is opposite to the first direction during the second time period, and the torque current causing the motor to apply force only in the first direction during an overlap of the first time period and the second time period.

* * * * *